United States Patent
Moren

(10) Patent No.: US 8,153,244 B2
(45) Date of Patent: Apr. 10, 2012

(54) REINFORCEMENT PATCHES WITH UNIDIRECTIONALLY-ALIGNED FIBERS

(75) Inventor: Dean M. Moren, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/122,743

(22) PCT Filed: Oct. 9, 2009

(86) PCT No.: PCT/US2009/060096
§ 371 (c)(1),
(2), (4) Date: Apr. 6, 2011

(87) PCT Pub. No.: WO2010/045100
PCT Pub. Date: Apr. 22, 2010

(65) Prior Publication Data
US 2011/0195221 A1    Aug. 11, 2011

Related U.S. Application Data

(60) Provisional application No. 61/105,473, filed on Oct. 15, 2008.

(51) Int. Cl.
*B32B 27/04* (2006.01)
(52) U.S. Cl. ............... 428/297.4; 428/298.1; 428/299.4; 428/300.1; 428/299.7; 156/330
(58) Field of Classification Search ............... 428/297.4, 428/297.7, 298.1, 299.4, 300.1, 413, 299.7; 156/330
See application file for complete search history.

(56) References Cited

U.S. PATENT DOCUMENTS

| | | | | |
|---|---|---|---|---|
| 3,405,026 A | * | 10/1968 | Roberts | 428/35.8 |
| 4,374,890 A | | 2/1983 | Shimizu et al. | |
| 4,378,394 A | * | 3/1983 | Miura et al. | 428/113 |
| 4,399,174 A | | 8/1983 | Tanaka et al. | |
| 4,444,818 A | | 4/1984 | Tominaga et al. | |
| 4,766,183 A | | 8/1988 | Rizk et al. | |
| 4,803,105 A | | 2/1989 | Kretow et al. | |
| 5,188,878 A | * | 2/1993 | Takezawa et al. | 428/114 |
| 5,308,430 A | | 5/1994 | Saito et al. | |
| 5,496,602 A | * | 3/1996 | Wai | 428/40.4 |

(Continued)

FOREIGN PATENT DOCUMENTS
EP    0 078 695    5/1983
(Continued)

OTHER PUBLICATIONS

International Search Report, PCT/US2009/060096, dated May 10, 2010, 5 pages.

*Primary Examiner* — N. Edwards
(74) *Attorney, Agent, or Firm* — Dena M. Ehrich

(57) ABSTRACT

Reinforcement patches comprising a mastic and a plurality of unidirectionally-aligned fibers at least partially embedded in a first major surface of the mastic are described. Generally, at least 90% of the unidirectionally-aligned fibers are oriented having an axis of alignment within +/−10 degrees of the average axis of alignment of the unidirectionally-aligned fibers. Reinforcement patches that include an encapsulating resin and a cover layer are also described. Methods of reinforcing a panel using reinforcement panels, and panels reinforced with the patches are also disclosed.

16 Claims, 2 Drawing Sheets

U.S. PATENT DOCUMENTS

| | | |
|---|---|---|
| 5,711,834 A | 1/1998 | Saito |
| 5,879,778 A * | 3/1999 | Barnes .......................... 428/102 |
| 6,269,599 B1 * | 8/2001 | Scherer ........................ 52/223.6 |
| 6,586,089 B2 * | 7/2003 | Golden .......................... 428/346 |
| 2002/0009582 A1 * | 1/2002 | Golden ....................... 428/306.6 |
| 2004/0028862 A1 | 2/2004 | Burwell et al. |
| 2007/0140958 A1 * | 6/2007 | deKemp ....................... 424/1.11 |
| 2008/0017270 A1 | 1/2008 | Newton et al. |

FOREIGN PATENT DOCUMENTS

| | | |
|---|---|---|
| WO | 97/23577 | 7/1997 |
| WO | 01/94493 | 12/2001 |
| WO | 2005/097444 | 10/2005 |

* cited by examiner

REINFORCEMENT PATCHES WITH UNIDIRECTIONALLY-ALIGNED FIBERS

CROSS REFERENCE TO RELATED APPLICATIONS

This application is a national stage filing under 35 U.S.C. 371 of PCT/US2009/060096, filed Oct. 9, 2009, which claims priority to U.S. Provisional Application No. 61/105,473, filed Oct. 15, 2008, the disclosure of which is incorporated by reference in its/their entirety herein.

FIELD

The present disclosure relates to reinforcement patches, e.g., reinforcement patches used to strengthen and stiffen metal panels. The reinforcement patches include unidirectionally-aligned reinforcing fibers and a mastic.

SUMMARY

Briefly, in one aspect, the present disclosure provides a reinforcing patch comprising a mastic and a plurality of unidirectionally-aligned fibers at least partially embedded in a first major surface of the mastic. At least 90% of the fibers are oriented having an axis of alignment within +/−10 degrees of the average axis of alignment of the unidirectionally-aligned fibers.

In some embodiments, the mastic comprises a heat-curable epoxy resin. In some embodiments, the mastic comprises the heat-curable epoxy resin, an acrylic copolymer, and microspheres, e.g., in some embodiments, the mastic comprises 40 to 65 parts by weight epoxy resin, 10 to 30 parts by weight acrylic copolymer, and 25 to 35 parts by weight microspheres, based on the total weight of the epoxy resin, the acrylic copolymer, and the microspheres.

In some embodiments, the plurality of fibers comprises glass fibers. In some embodiments, at least 95% of the fibers are single fibers. In some embodiments, the axis of alignment of at least 95% of the fibers is within +/−10 degrees of the average axis of alignment of the unidirectionally-aligned fibers. In some embodiments, the axis of alignment of at least 90% of the fibers is within +/−5 degrees of the average axis of alignment of the unidirectionally-aligned fibers.

In some embodiments, the reinforcing patch further comprises off-axis fibers having an axis of alignment greater than +/−10 degrees of the average axis of alignment of the unidirectionally-aligned fibers. In some embodiments, a ratio of an average gap between adjacent off-axis fibers relative an average gap between adjacent oriented fibers is at least 50:1.

In some embodiments, the fibers are fully embedded in the mastic. In some embodiments, at least 95%, e.g., at least 98% of the fibers are only partially embedded in the mastic. In some embodiments, the reinforcing patch further comprises an encapsulating resin adjacent the surface of the mastic. In some embodiments, the encapsulating resin comprises an adhesive. In some embodiments, the reinforcing patch further comprises a cover layer bonded to the encapsulating resin. In some embodiments, the reinforcing patch further comprises a release liner contacting the second major surface of the mastic opposite the fibers.

In another aspect, the present disclosure provides a method of reinforcing a panel with a reinforcing patch. The method comprising using the mastic to adhere the reinforcing patch to a panel and curing the mastic.

In yet another aspect, the present disclosure provides a reinforced panel comprising a panel and a reinforcing patch bonded to the panel by the mastic.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, reinforcing patches comprise a reinforcing material and mastic. The mastic is used to adhere the reinforcing patch to the substrate being reinforced and to transfer panel bending stresses to the reinforcing material. Reinforcing patches are used to strengthen and stiffen panels, e.g., metal and plastic panels. For example, the automobile industry has used reinforcing patches with low gauge metal panels, especially those used in automobile doors, hoods, and trunks, to improve flexural strength and avoid undesirable buckling at low applied stresses.

Existing reinforcing patches typically comprise a woven glass backing and curable epoxy mastic. While woven glass backings have provided adequate performance, efforts have been made to identify lower-cost, low-weight reinforcing patches. For example, inorganic fabrics, organic fabrics, plastic films, paper, unwoven fabrics, and metal foils have been suggested. The present inventors screened such materials. Cotton (organic fabric), plastic, paper, and short-fiber glass sheets lacked sufficient strength and modulus. Metal foils (aluminum and stainless steel) offered strength and rigidity, but warped the steel panels they were attached to due to thermal expansion differences.

Figure 1:
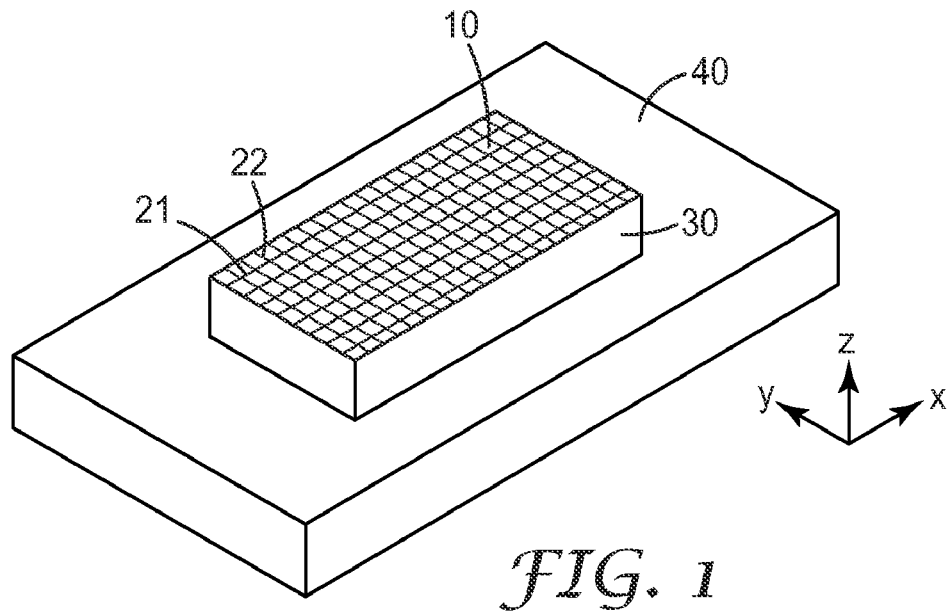
FIG. 1 illustrates a prior-art reinforcement patch comprising a woven glass mat.

In general, woven (e.g., woven glass fabrics) and organic fabrics include fibers oriented in at least two directions. For example, referring to FIG. 1, woven glass fabric 10 is adhered to panel 40 via mastic 30. Woven glass fabric 10 includes first fibers 21 and second fibers 22, oriented perpendicular to first fibers 21. Thus, as panel 40 is bent, first fibers 21 resist deformation in the x-direction, while second fibers 22 resist deformation in the y-direction. Similarly, nonwoven fabrics, plastic films, papers, and metal foils resist deformation in both the x- and y-directions.

The present inventors have discovered that unidirectionally-aligned fibers provide low-cost, warp-free reinforcement despite providing resistance to deformation in only one direction. Generally, any fibers known for use in reinforcing patches may be used. In some embodiments, inorganic fibers, e.g., glass fibers, may be used. Other exemplary fibers include carbon fibers, polymeric fibers (e.g., polyamide and polyimide fibers), and organic fibers (e.g., natural fibers).

In some embodiments, the fibers are single, individual fibers. In some embodiments, the fibers may be grouped (e.g., twisted) to form multi-fiber bundles.

The axis of alignment of a single fiber is the major axis of that fiber, i.e., the length direction of the fiber. The axis of alignment of a plurality of fibers is the average axis of alignment of the fibers within the plurality of fibers. As used herein, an individual fiber is "oriented" if its axis of alignment is within +/−10 degrees of the average axis of alignment of the fibers within the plurality of fibers. As used herein, a plurality of fibers is "unidirectionally-aligned" if at least 90% of the fibers are oriented (i.e., if the axis of alignment of at least 90% of the fibers is within +/−10 degrees of the average axis of alignment of the fibers within the plurality of fibers). In some embodiments, at least 95%, or even at least 98% of the fibers are aligned within +/−10 degrees of the average axis of alignment of the fibers within the plurality of fibers. In some embodiments, the axes of alignment of at least 90% (e.g., at least 95%, or even at least 98%) of the fibers are within +/−5 degrees (e.g., within +/−2 degrees) of the average axis of alignment of the fibers within the plurality of fibers.

Depending on the method of providing the fibers, a relatively small number of fibers may have an axis of alignment greater than 10 degrees (e.g., greater than 45 degrees, or even greater than 75 degrees (e.g., approximately 90 degrees) relative to the average axis of alignment of the fibers within the plurality of fibers. The number of such "off-axis" fibers per unit length is typically much lower than the number of oriented fibers per unit length. For example, in some embodiments, the ratio of the average gap between adjacent off-axis fibers relative to the average gap between adjacent oriented fibers is at least 50:1, in some embodiments, at least 100:1, at least 500:1, or even at least 1000:1.

In some embodiments, the average gap between adjacent oriented fibers is less than the average width of the fibers. In some embodiments, the average gap is no greater than 80% of the average width of the fibers, e.g., no greater than 50%, no greater than 25%, or even no greater than 10% of the average width of the fibers. In some embodiments, at least some of the oriented fibers are in contact with adjacent oriented fibers. In contrast, with woven webs, adjacent fibers aligned in one direction (e.g., the down web fibers) are separated by at least the width of the interwoven fibers (e.g., the cross web fibers).

Figure 2:
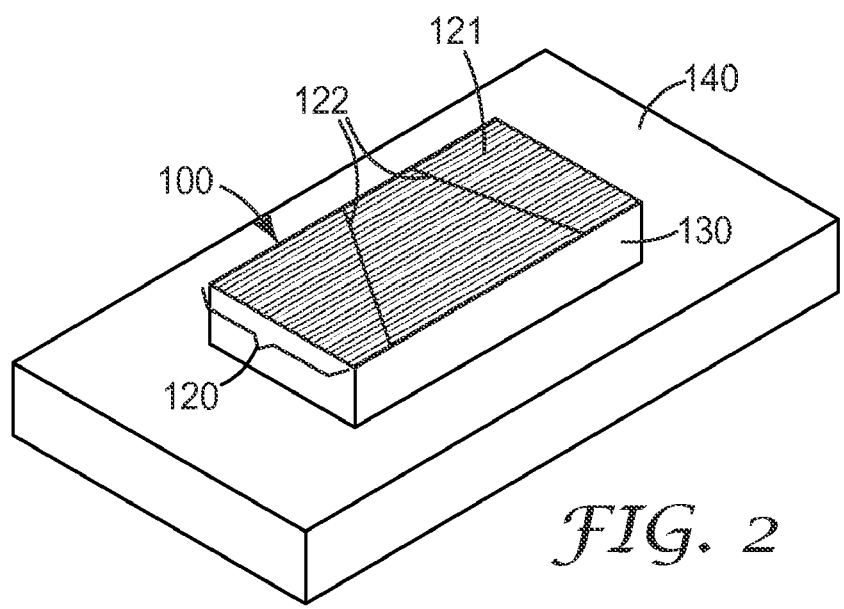
FIG. 2 illustrates an exemplary reinforcing patch according to some embodiments of the present disclosure.

Referring to FIG. 2, exemplary reinforcing patch 100 according to some embodiments of the present disclosure is shown adhered to panel 140. Reinforcing patch 100 includes mastic 130 and unidirectionally-aligned fibers 120. Unidirectionally-aligned fibers 120 include primarily oriented fibers 121, but, in some embodiments, may include some off-axis fibers 122.

Generally, any known mastic may be used. In some embodiments, the mastic comprises a curable material, e.g., a heat-curable material. In some embodiments, the mastic comprises an epoxy resin. The selection of a mastic can depend on a wide variety of factors including the composition of the fibers and the substrate to which the reinforcing fabric is to be applied, and available curing conditions. For example, in the automobile industry, reinforcing patches are often applied directly to oily, unpainted, metal panels, and the mastic is cured during the conventional drying process. In addition to such process conditions, the choice of mastic can also depend on end-use parameters including temperature and exposure to moisture.

In some embodiments, the mastic comprises an epoxy resin and a curing agent. Exemplary epoxy resins include cycloaliphatic epoxides, epoxidized novolac resins, epoxidized bisphenol A or bisphenol F resins, butanediol diglycidyl ether, neopentyl glycol diglycidyl ether, flexibilizing epoxy resins and combination thereof. These resins can be reacted with carboxy terminated butadiene acrylonitrile to produce rubber modified epoxy resins. The diglycidyl ether of bisphenol A and the diglycidyl ether of bisphenol F reacted with carboxy terminated butadiene acrylonitrile to produce a crosslinkable resin with improved peel strength and impact resistance.

In some embodiments, the mastic may include additives such as plasticizers, flame retardants, flow control agents, fillers, and the like. In some embodiments, curing agents may be used. Exemplary curing agents include Lewis acids, substituted imidazoles and amine salts. The mastic may also include an appropriate catalyst (e.g., substituted urea catalysts such as phenyl dimethyl urea).

In some embodiments, the mastic comprises a heat-curable epoxy resin, an acrylic copolymer, and microspheres (e.g., glass microspheres). In some embodiments, the mastic comprises 40 to 65 parts by weight epoxy resin, 10 to 30 parts by weight acrylic copolymer, and 25 to 35 parts by weight microspheres. In some embodiments, the mastic comprises 40 to 55 (e.g., 44 to 46) parts by weight epoxy resin, 15 to 25 (e.g., 23 to 25) parts by weight acrylic copolymer, and 25 to 35 (e.g., 27 to 29) parts by weight microspheres. The parts by weight are based on the total weight of the epoxy, the acrylic copolymer, and the microspheres.

Beam stiffness increases with the third power of beam thickness. Similarly, the stiffness improvement provided by applying a reinforcing patch to a panel increases with the cube of the distance separating the panel from the reinforcing fibers. In addition to adhering the reinforcing fibers to the panel, the mastic is used to provide the desired gap between the panel and the reinforcing fibers. However, increasing the thickness of the mastic to increase this gap can add undesirable raw material costs.

Figure 3:
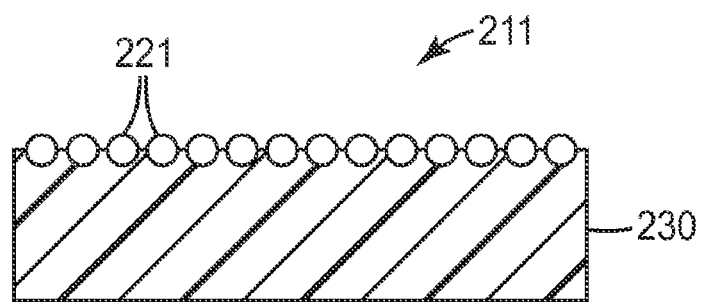
FIG. 3 illustrates a cross section of an exemplary reinforcing patch according to some embodiments of the present disclosure.

In order to maximize the distance between the panel and the reinforcing fibers, in some embodiments, it may be desirable to apply the fibers directly to the surface of the mastic. In some embodiments, the fibers may be partially embedded in the mastic. In either case, at least a portion of the fibers remain exposed above the surface of the mastic. A cross-section of one such exemplary reinforcing patch is illustrated in FIG. 3. Reinforcing patch 211 includes mastic 230 and plurality of unidirectionally-aligned reinforcing fibers 221. Fibers 221 are partially embedded in the top surface of mastic 230, leaving a portion of the fibers exposed. In some embodiments, the fibers may be completely embedded in the mastic.

Figure 4:
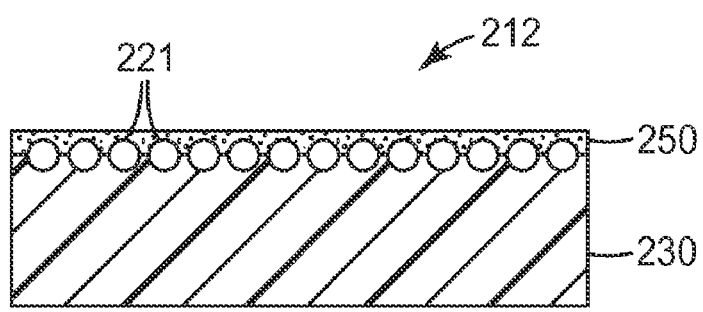
FIG. 4 illustrates a cross-section of an exemplary reinforcing patch that includes an encapsulating resin in accordance with some embodiments of the present disclosure.

In some embodiments, it may be desirable to encapsulate the fibers, as illustrated in FIG. 4. Reinforcing patch 212 includes mastic 230 and plurality of unidirectionally-aligned reinforcing fibers 221. Encapsulating material 250 covers the surface of the fibers left exposed by mastic 230. Generally, any known encapsulating resin may be used. In some embodiments, non-curable, non-structural materials may be used. In some embodiments, the encapsulant may be an adhesive. In some embodiments, the adhesive is a non-structural adhesive. In some embodiments, the adhesive is a pressure sensitive adhesive.

Figure 5:
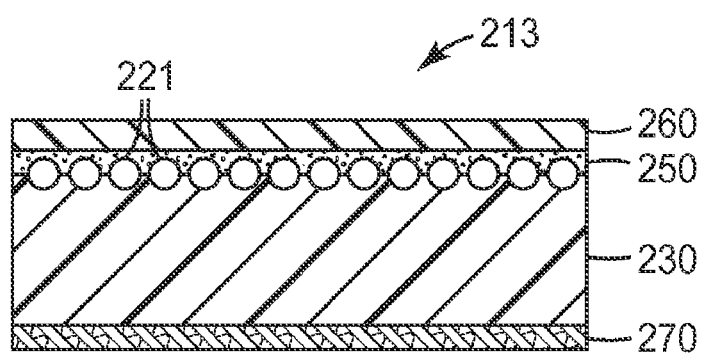
FIG. 5 illustrates an exemplary reinforcing patch that includes a cover layer and a release liner in accordance with some embodiments of the present disclosure.

In some embodiments, additional layers may be included. Referring to FIG. 5, reinforcing patch 213 includes additional cover layer 260 attached to encapsulating material 250. In addition to providing protection from, e.g., abrasion and moisture, cover layer 260 may also provide additional stiffness to the reinforcing patch. Exemplary cover layers include polymeric films, e.g., thermoplastic polymeric films, or cellulose. In some embodiments, the material must be suitable for use at the temperatures used to cure the mastic. In some embodiments, polyesters may be useful, e.g., for use with cured epoxy mastics.

In addition to protecting the fibers, the encapsulant and/or the cover layer can protect the mastic itself. For example, epoxy materials absorb moisture, which often decreases storage stability. In some embodiments, the encapsulant and/or the cover layer provides a barrier that slows moisture ingress during storage, thus extending storage stability.

Referring to FIG. 5, in some embodiments, it may be desirable to include a layer adjacent the lower surface of the mastic 230, opposite the reinforcing fibers 221. For example, in some embodiments, release liner 270 may be used to aid in handling the reinforcing patch during processing, shipping, storage and installation. Exemplary release liners include silicone-treated papers and films.

Unidirectionally-aligned reinforcing fibers can be applied directly to the surface of the mastic. Optional additional layers may then be applied using conventional means (e.g., coating or laminating). In some embodiments, the fibers can be conveniently applied to the mastic in conjunction with one or more additional layers of the reinforcing patch. For example, in some embodiments, unidirectionally-aligned reinforcing fibers applied to an encapsulating material may be applied to mastic. In some embodiments, a cover layer may be included in the structure prior to application to the mastic. For example, one convenient method of applying the fibers to the mastic includes providing a tape comprising the cover layer, a layer of encapsulating material (e.g., an adhesive) and unidirectionally-aligned reinforcing fibers applied to an encapsulating material. The structure can then be laminated to the mastic by bonding the encapsulating material to the mastic. Alternatively, the mastic could be applied (e.g., cast or coated) to the surface of supported fibers (e.g., fibers aligned on a carrier or adhered to an encapsulating material).

Typically, the reinforcing patch is adhered under pressure to a surface of the panel requiring reinforcement. The mastic is then cured using known methods, e.g., hot air ovens, infrared heating, and induction heating. This heat curing treatment may be a separate step, or it may occur simultaneously during a later stage of part assembly, e.g., with painted metal panels, during the paint-bake cycle.

In some embodiments, the reinforcing patch may be applied directly to the panel. Generally, it is desirable to have good contact between the reinforcing sheet and the panel. In some embodiments, the reinforcing sheet may be molded to conform to the surface of the panel where it is to be applied.

Example 1

Bisphenol A diglycidyl ether (179.2 grams, EPON 828, Heloxy Corp.) and acrylic copolymer of butyl acrylate, methyl acrylate, and isooctyl acrylate (100.8 grams, 3M Company) were kneaded in a Brabender mixer first for 4 hours at 150° C., then for 15.5 hours at 40° C. A portion (72.92 gram) was then kneaded in a Brabender mixer set at 65° C. as EPON 828 (1.63 grams), SCOTCHLITE K37 glass bubbles (30.45 grams, 3M Company), dicyandiamide (2.51 grams), and OMICURE 24 (1.35 grams, Air Products) were sequentially added. A portion of the resulting epoxy mastic was pressed between a glass fiber construction (890NR, 3M Company) and a silicone treated polyester film using a 70° C. press. The resulting mastic layer was 1 millimeter thick, and the construction had an areal mass 0.8 kg/m2 (with the release liner removed).

The 890NR glass fiber construction comprised a polyester film backing; an intermediate adhesive layer; and multiple long, partially exposed, unidirectionally-aligned single glass fibers. When applied to the mastic to produce the reinforcing fabric, the intermediate adhesive layer served as an encapsulant and the polyester film backing served as a cover layer.

A 25 mm×150 mm strip was cut in the direction of the average axis of alignment and the mastic was affixed to a 40 mm by 150 mm steel panel. The mastic was cured at 177° C. for 30 minutes, and cooled. Bending force was measured using a 3-point bend fixture at 5 mm/min. The fixture's single bar pressed on the steel panel and the fixture's two bars pressed on the reinforcing tape backing. The two bars were separated by 100 mm. The reinforced construction required 63 N force at 2 mm deflection and 150 N maximum force (i.e., the force at break). A typical industry specification requires a minimum of 60 N force at 2 mm deflection and at least 130 N force at break.

Example 1 was repeated, except using 12.75 grams EPON 828, 10.20 grams acrylic copolymer, 2.55 grams isodecyl benzoate, 10.20 grams SCOTCHLITE K37 glass bubbles, 0.70 grams dicyandiamide, and 0.38 grams OMICURE 24. A portion of the resulting epoxy mastic was pressed between silicone treated polyester film and each of several fiberglass backings. The backing of Comparative Example 1 (CE-1) comprised glass filaments oriented in two directions (woven glass backing #F 07628 0380 642, obtained from BGF Industries). The backing of Comparative Example 2 (CE-2) comprised randomly oriented glass fibers (non-woven glass mat 20103A from Technical Fibers Products). The backing of Example 2 (EX-2) comprised the 890NR fiber construction. Samples were assembled, cured, and tested as in Example 1. The results are summarized in Table 1.

TABLE 1

Comparison of reinforcing properties.

| | | Force (N) | |
|---|---|---|---|
| Example | Reinforcement | 2 mm deflection | maximum |
| CE-1 | Woven mat | 91 | 165 |
| CE-2 | Nonwoven | 68 | 97 |
| EX-2 | Unidirectional | 131 | 143 |

Reinforcing patches comprising unidirectionally-aligned glass filaments have satisfactory reinforcement properties compared to these woven and nonwoven mats.

Various modifications and alterations of this invention will become apparent to those skilled in the art without departing from the scope and spirit of this invention.

What is claimed is:

1. A reinforcing patch comprising a mastic and a plurality of unidirectionally-aligned fibers at least partially embedded in a first major surface of the mastic, wherein at least 90% of the unidirectionally-aligned fibers are oriented having an axis of alignment within +/−10 degrees of the average axis of alignment of the unidirectionally-aligned fibers.

2. The reinforcing patch of claim 1, wherein the mastic comprises a heat-curable epoxy resin.

3. The reinforcing patch of claim 2, wherein the mastic comprises the heat-curable epoxy resin, an acrylic copolymer, and microspheres.

4. The reinforcing patch of claim 3, wherein the mastic comprises 40 to 65 parts by weight epoxy resin, 10 to 30 parts by weight acrylic copolymer, and 25 to 35 parts by weight microspheres, based on the total weight of the epoxy resin, the acrylic copolymer, and the microspheres.

5. The reinforcing patch according to claim 3, wherein the acrylic copolymer comprises the reaction product of butyl acrylate, methyl acrylate, and isooctyl acrylate.

6. The reinforcing patch according to claim 1, wherein the plurality of unidirectionally-aligned fibers comprises glass fibers.

7. The reinforcing patch according to claim 1, wherein at least 95% of the unidirectionally-aligned fibers are single fibers.

8. The reinforcing patch according to claim 1, wherein the axis of alignment of at least 95% of the unidirectionally-aligned fibers is within +/−5 degrees of the average axis of alignment of the unidirectionally-aligned fibers.

9. The reinforcing patch according to claim 1, further comprising off-axis fibers having an axis of alignment greater than +/−10 degrees of the average axis of alignment of the unidirectionally-aligned fibers, and wherein a ratio of an average gap between adjacent off-axis fibers relative an average gap between adjacent oriented fibers is at least 50:1.

10. The reinforcing patch according to claim 1, wherein at least 95% the plurality of unidirectionally-aligned fibers are only partially embedded in the mastic.

11. The reinforcing patch according to claim 1, further comprising an encapsulating resin adjacent the surface of the mastic.

12. The reinforcing patch of claim 11, wherein the encapsulating resin comprises an adhesive.

13. The reinforcing patch according to claim 1, further comprising a cover layer bonded to the encapsulating resin.

14. The reinforcing patch of claim 13, wherein the cover layer comprises a thermoplastic.

15. A method of reinforcing a panel with the reinforcing patch according to claim 1 comprising, using the mastic to adhere the reinforcing patch to a panel and curing the mastic.

16. A reinforced panel comprising a panel and the reinforcing patch according to claim 1 bonded to the panel by the mastic.

* * * * *

UNITED STATES PATENT AND TRADEMARK OFFICE
CERTIFICATE OF CORRECTION

Page 1 of 1

PATENT NO. : 8,153,244 B2
APPLICATION NO. : 13/122743
DATED : April 10, 2012
INVENTOR(S) : Dean M Moren It is certified that error appears in the above-identified patent and that said Letters Patent is hereby corrected as shown below:

<u>Column 8</u>
Line 2, in Claim 10, after "95%" insert -- of --.

Signed and Sealed this
Tenth Day of July, 2012

David J. Kappos
*Director of the United States Patent and Trademark Office*